United States Patent
Song et al.

(10) Patent No.: US 9,631,567 B2
(45) Date of Patent: Apr. 25, 2017

(54) SENSOR BASED MEASUREMENT AND PURGE CONTROL OF FUEL VAPORS IN INTERNAL COMBUSTION ENGINES

(71) Applicant: GM Global Technology Operations LLC, Detroit, MI (US)

(72) Inventors: B. Jerry Song, Novi, MI (US); Martino Casetti, Clarkston, MI (US); Scott Jeffrey, Hartland, MI (US); Louis A. Avallone, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 924 days.

(21) Appl. No.: 13/967,660

(22) Filed: Aug. 15, 2013

(65) Prior Publication Data

US 2015/0051811 A1 Feb. 19, 2015

(51) Int. Cl.
*F02D 41/04* (2006.01)
*F02D 41/24* (2006.01)
(Continued)

(52) U.S. Cl.
CPC ..... *F02D 41/2474* (2013.01); *F02D 41/0045* (2013.01); *F02D 41/02* (2013.01);
(Continued)

(58) Field of Classification Search
CPC ...... F02D 41/02; F02D 41/04; F02D 41/0045; F02D 41/0055; F02D 41/144; F02D 41/1448; F02D 41/1456; F02D 41/1458; F02D 41/1495; F02D 41/2474; F02D 2250/08; F02D 2200/0402; F02D 2200/0406; G01L 19/0092; F02M 25/089
See application file for complete search history.

(56) References Cited

U.S. PATENT DOCUMENTS 4,081,725 A 3/1978 Schmidt et al.
4,404,946 A 9/1983 Hoard et al.
(Continued)

FOREIGN PATENT DOCUMENTS

CN 101932816 A 12/2010
CN 101988432 A 3/2011
(Continued)

OTHER PUBLICATIONS

Bugbee, B. and Blonquist, M., "Absolute and Relative Gas Concentration: Understanding Oxygen in Air," Feb. 27, 2006, Apogee Instruments, pp. 1-9<www.apogeeinstruments.com/content/o2s_correcting.pdf>.
(Continued)

*Primary Examiner* — Hieu T Vo
*Assistant Examiner* — Arnold Castro

(57) ABSTRACT

A fuel control system for a vehicle includes a pressure compensation module that compensates an intake oxygen signal based on an intake pressure signal and that generates a compensated intake oxygen signal. A blow-by estimation module generates an estimated blow-by flow. A purge flow estimation module estimates the purge flow based on the compensated intake oxygen signal and the estimated blow-by flow. A fuel control estimation module reduces fueling to injectors of an engine of the vehicle based on the purge flow.

20 Claims, 4 Drawing Sheets

(51) Int. Cl.
  *F02D 41/14* (2006.01)
  *F02D 41/00* (2006.01)
  *F02M 25/08* (2006.01)
  *F02D 41/02* (2006.01)
  *G01L 19/00* (2006.01)

(52) U.S. Cl.
  CPC ........... *F02D 41/04* (2013.01); *F02D 41/144* (2013.01); *F02D 41/1448* (2013.01); *F02D 41/1456* (2013.01); *F02D 41/1458* (2013.01); *F02D 41/1495* (2013.01); *F02M 25/089* (2013.01); *G01L 19/0092* (2013.01); *F02D 41/0055* (2013.01); *F02D 2200/0402* (2013.01); *F02D 2200/0406* (2013.01); *F02D 2250/08* (2013.01)

(56) References Cited

U.S. PATENT DOCUMENTS

| | | |
|---|---|---|
| 4,790,286 A | 12/1988 | Nishida et al. |
| 4,836,174 A | 6/1989 | Chujo et al. |
| 4,905,654 A | 3/1990 | Katsuno et al. |
| 4,942,860 A | 7/1990 | Chujo et al. |
| 4,990,235 A | 2/1991 | Chujo |
| 5,034,112 A | 7/1991 | Murase et al. |
| 5,190,017 A | 3/1993 | Cullen et al. |
| 5,205,260 A | 4/1993 | Takahashi et al. |
| 5,207,093 A | 5/1993 | Maeda |
| 5,465,617 A | 11/1995 | Dudek et al. |
| 5,499,617 A * | 3/1996 | Kitajima .............. F02M 25/08 123/698 |
| 5,540,091 A | 7/1996 | Nakagawa |
| 5,617,337 A | 4/1997 | Eidler et al. |
| 5,639,961 A | 6/1997 | Lautenschutz |
| 5,685,284 A | 11/1997 | Nakamichi |
| 6,000,385 A | 12/1999 | Fukuma |
| 6,029,451 A | 2/2000 | Gartner |
| 6,128,902 A | 10/2000 | Kolmanovsky et al. |
| 6,164,270 A | 12/2000 | Bidner et al. |
| 6,178,943 B1 | 1/2001 | Taga et al. |
| 6,240,365 B1 | 5/2001 | Bunn |
| 6,309,534 B1 | 10/2001 | Fray et al. |
| 6,311,679 B1 | 11/2001 | Druzhinina et al. |
| 6,367,462 B1 | 4/2002 | McKay et al. |
| 6,405,106 B1 | 6/2002 | Sheth et al. |
| 6,505,603 B1 | 1/2003 | Schray et al. |
| 6,516,656 B1 | 2/2003 | Jetter et al. |
| 6,575,148 B1 | 6/2003 | Bhargava et al. |
| 6,581,370 B2 | 6/2003 | Sato et al. |
| 6,609,493 B2 | 8/2003 | Yamaguchi et al. |
| 6,711,892 B2 | 3/2004 | Tamura et al. |
| 6,732,031 B1 | 5/2004 | Lightner et al. |
| 6,738,697 B2 | 5/2004 | Breed |
| 6,739,177 B2 | 5/2004 | Sato et al. |
| 6,772,586 B2 | 8/2004 | Miyahara et al. |
| 6,802,302 B1 | 10/2004 | Li et al. |
| 6,817,197 B1 | 11/2004 | Padfield |
| 6,820,600 B1 | 11/2004 | Sisken et al. |
| 7,016,779 B2 | 3/2006 | Bowyer |
| 7,104,259 B2 | 9/2006 | Terada |
| 7,155,332 B2 | 12/2006 | Yamada et al. |
| 7,181,335 B2 | 2/2007 | Barba et al. |
| 7,181,908 B2 | 2/2007 | Naik |
| 7,195,009 B2 | 3/2007 | Cullen |
| 7,254,477 B1 | 8/2007 | Banks |
| 7,261,098 B2 | 8/2007 | Vigild et al. |
| 7,267,117 B2 | 9/2007 | Tonetti et al. |
| 7,318,409 B2 | 1/2008 | Cullen |
| 7,398,775 B2 | 7/2008 | Cullen |
| 7,400,967 B2 | 7/2008 | Ueno et al. |
| 7,409,275 B2 | 8/2008 | Sakurai et al. |
| 7,463,960 B2 | 12/2008 | Thiel et al. |
| 7,474,954 B1 | 1/2009 | Zagone |
| 7,526,950 B2 | 5/2009 | Van Nieuwstadt et al. |
| 7,532,963 B1 | 5/2009 | Lowrey et al. |
| 7,565,892 B1 | 7/2009 | Cleary et al. |
| 7,565,901 B2 | 7/2009 | Furuta et al. |
| 7,620,490 B2 | 11/2009 | Matsunaga |
| 7,650,211 B2 | 1/2010 | Wang et al. |
| 7,654,253 B2 | 2/2010 | Cullen |
| 7,715,976 B1 | 5/2010 | Xiao et al. |
| 7,974,749 B2 | 7/2011 | Zettel et al. |
| 8,042,528 B2 | 10/2011 | Gates et al. |
| 8,127,816 B2 | 3/2012 | Gnan |
| 8,315,759 B2 | 11/2012 | Bauerle |
| 8,469,010 B2 | 6/2013 | Inoue |
| 8,521,354 B2 | 8/2013 | Sasaki |
| 8,543,317 B2 | 9/2013 | Pasero et al. |
| 8,733,081 B2 | 5/2014 | Miyashita |
| 9,080,528 B2 | 7/2015 | Aoyagi |
| 9,228,524 B2 | 1/2016 | Song |
| 2002/0029768 A1 * | 3/2002 | Matsubara .......... F02D 41/0045 123/500 |
| 2002/0066442 A1 | 6/2002 | Muller et al. |
| 2002/0139360 A1 * | 10/2002 | Sato ................... F02D 41/0037 123/698 |
| 2003/0047172 A1 * | 3/2003 | Kim ................... F02D 41/0042 123/698 |
| 2003/0106367 A1 | 6/2003 | Osaki et al. |
| 2003/0115854 A1 | 6/2003 | Tamura et al. |
| 2003/0159521 A1 | 8/2003 | Sarholz et al. |
| 2003/0216856 A1 | 11/2003 | Jacobson |
| 2004/0061290 A1 | 4/2004 | Gray |
| 2004/0079332 A1 | 4/2004 | Kotwicki |
| 2004/0230345 A1 | 11/2004 | Tzamaloukas |
| 2005/0072411 A1 | 4/2005 | Cullen |
| 2005/0131620 A1 | 6/2005 | Bowyer |
| 2005/0139193 A1 | 6/2005 | Kobayashi et al. |
| 2005/0161029 A1 | 7/2005 | Ishikawa |
| 2005/0274369 A1 | 12/2005 | Tonetti et al. |
| 2006/0048760 A1 | 3/2006 | Matsunaga et al. |
| 2006/0064228 A1 | 3/2006 | Huang |
| 2006/0213490 A1 | 9/2006 | Vigild et al. |
| 2007/0005609 A1 | 1/2007 | Breed |
| 2007/0021901 A1 | 1/2007 | Yamaguchi et al. |
| 2007/0062499 A1 | 3/2007 | Miyasako et al. |
| 2007/0100519 A1 | 5/2007 | Engel |
| 2007/0174003 A1 | 7/2007 | Ueno et al. |
| 2007/0181111 A1 | 8/2007 | Cullen |
| 2007/0192018 A1 | 8/2007 | Gibson et al. |
| 2008/0098734 A1 | 5/2008 | Olsson |
| 2008/0178836 A1 | 7/2008 | Yamashita et al. |
| 2008/0178853 A1 | 7/2008 | Yamaoka et al. |
| 2008/0189009 A1 | 8/2008 | Wang et al. |
| 2008/0270012 A1 | 10/2008 | Cullen |
| 2008/0316006 A1 | 12/2008 | Bauman et al. |
| 2009/0038308 A1 | 2/2009 | Nagae |
| 2009/0132153 A1 | 5/2009 | Shutty et al. |
| 2009/0198431 A1 | 8/2009 | Cleary et al. |
| 2009/0254245 A1 | 10/2009 | Bauerle |
| 2010/0012100 A1 * | 1/2010 | Asano ................. F02D 41/0042 123/520 |
| 2010/0042284 A1 | 2/2010 | Sasaki |
| 2010/0077990 A1 | 4/2010 | Shishime et al. |
| 2010/0185379 A1 | 7/2010 | Burkhardt et al. |
| 2010/0199665 A1 | 8/2010 | Kapus |
| 2010/0224174 A1 | 9/2010 | Tabata |
| 2010/0307140 A1 | 12/2010 | Viola et al. |
| 2011/0011378 A1 | 1/2011 | Nakamura |
| 2011/0023847 A1 | 2/2011 | Gates et al. |
| 2011/0054762 A1 | 3/2011 | Nakayama et al. |
| 2011/0072793 A1 | 3/2011 | Bidner et al. |
| 2011/0073086 A1 | 3/2011 | Bahlo et al. |
| 2011/0077838 A1 | 3/2011 | Osburn et al. |
| 2011/0166767 A1 | 7/2011 | Kurtz et al. |
| 2011/0191010 A1 | 8/2011 | Russ et al. |
| 2011/0282539 A1 * | 11/2011 | Inoue ................... F01M 13/022 701/31.4 |
| 2012/0046854 A1 | 2/2012 | Sangkyu et al. |
| 2012/0116648 A1 | 5/2012 | Russ et al. |
| 2012/0227714 A1 | 9/2012 | Surnilla et al. |
| 2012/0227719 A1 | 9/2012 | Surnilla et al. |
| 2012/0247439 A1 | 10/2012 | Ramappan et al. |

(56) References Cited

U.S. PATENT DOCUMENTS

| | | | |
|---|---|---|---|
| 2012/0303346 A1 | 11/2012 | Takezoe et al. | |
| 2013/0054122 A1 | 2/2013 | Aoyagi | |
| 2013/0073179 A1 | 3/2013 | Song et al. | |
| 2013/0199177 A1 | 8/2013 | Holberg et al. | |
| 2013/0213352 A1* | 8/2013 | Kumar | F02D 41/00 123/406.23 |
| 2013/0226435 A1 | 8/2013 | Wasberg et al. | |
| 2013/0238218 A1 | 9/2013 | Wiggins et al. | |
| 2013/0253798 A1 | 9/2013 | Ramappan et al. | |
| 2013/0253802 A1 | 9/2013 | Miyamoto et al. | |
| 2013/0268176 A1 | 10/2013 | Song et al. | |
| 2013/0332050 A1 | 12/2013 | Song et al. | |
| 2014/0149015 A1 | 5/2014 | Pursifull | |
| 2014/0257673 A1 | 9/2014 | Naik et al. | |
| 2014/0288804 A1* | 9/2014 | Pursifull | F02D 41/1454 701/104 |
| 2015/0051811 A1 | 2/2015 | Song et al. | |
| 2015/0075503 A1* | 3/2015 | Surnilla | F02M 25/0854 123/520 |
| 2015/0101327 A1* | 4/2015 | Clark | F02D 41/0052 60/599 |

FOREIGN PATENT DOCUMENTS

| | | |
|---|---|---|
| CN | 202510230 U | 10/2012 |
| EP | 1481295 A1 | 12/2004 |
| JP | 63140856 A | 6/1988 |
| JP | 63159664 A | 7/1988 |
| JP | 405118246 | 5/1993 |
| JP | 09042066 | 2/1997 |
| JP | 2003148258 A | 5/2003 |
| JP | 2006029084 A | 2/2006 |
| JP | 2008087480 A | 4/2008 |
| JP | 2008248888 A | 10/2008 |
| JP | 2009243283 A | 10/2009 |
| JP | 2009287491 A | 12/2009 |
| JP | 2010203281 A | 9/2010 |
| WO | WO-03065135 A1 | 7/2003 |
| WO | WO-2004027244 A1 | 4/2004 |
| WO | WO-2009118605 A1 | 10/2009 |
| WO | WO-2011145223 A1 | 11/2011 |

OTHER PUBLICATIONS

Bugbee, B. and Blonquist, M., "Absolute and Relative Gas Concentration: Understanding Oxygen in Air," Aug. 11, 2009, Apogee Instruments, pp. 1-10 <http://www.apogeeinstruments.com/content!AbsoluteandRelativeGasConcentration.pdf>.
U.S. Appl. No. 13/967,591, filed Aug. 15, 2013, Song.
U.S. Appl. No. 13/440,570, filed Apr. 5, 2012, Song.
U.S. Appl. No. 13/425,723, filed Mar. 21, 2012, Ramappan et al.
U.S. Appl. No. 13/408,577, filed Feb. 29, 2012, Wasberg et al.
SST Sensing Ltd, "Operating Principle and Construction of Zirconium Dioxide Oxygen Sensors," 2010, p. 1-14.
U.S. Appl. No. 13/238,460, filed Sep. 21, 2011, Song et al.
U.S. Appl. No. 13/440,570, filed Apr. 5, 2012, Song et al.
U.S. Appl. No. 13/490,821, filed Jun. 7, 2012, Wiggins et al.
U.S. Appl. No. 13/490,885, filed Jun. 7, 2012, Song et al.
U.S. Appl. No. 13/786,944, filed Mar. 6, 2013, Naik et al.

* cited by examiner

SENSOR BASED MEASUREMENT AND PURGE CONTROL OF FUEL VAPORS IN INTERNAL COMBUSTION ENGINES

CROSS-REFERENCE TO RELATED APPLICATIONS

This application is related to U.S. patent application Ser. No. 13/967,591 filed on Aug. 15, 2013. The entire disclosure of the above application is incorporated herein by reference.

FIELD

The present disclosure relates to engine control systems, and more particularly to fuel control systems for engines that adjust fueling based on purge flow.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An evaporative (EVAP) emissions control system recovers fuel vapor from a fuel tank of a vehicle. The EVAP system includes a canister and a purge valve. The fuel vapor is returned to an intake manifold for combustion in the engine. The fuel vapor displaces oxygen in the intake air when the purge valve is opened. Without adjustment for the fuel vapor, the intake air supplied to the cylinders will be rich. Therefore, the amount of fuel supplied by the fuel injectors should be reduced.

SUMMARY

A fuel control system for a vehicle includes a pressure compensation module that compensates an intake oxygen signal based on an intake pressure signal and that generates a compensated intake oxygen signal. A blow-by estimation module generates an estimated blow-by flow. A purge flow estimation module estimates purge flow based on the compensated intake oxygen signal and the estimated blow-by flow. A fuel control estimation module reduces fueling to injectors of an engine of the vehicle based on the purge flow.

In other features, the purge flow estimation module estimates a sum of blow-by flow and the purge flow based on the compensated intake oxygen signal. The purge flow estimation module estimates the sum of the blow-by flow and the purge flow using a lookup table indexed by the compensated intake oxygen signal. The purge flow estimation module includes a difference module that subtracts the estimated blow-by flow generated by the blow-by estimation module from the sum of the purge flow and the blow-by flow.

In other features, the blow-by estimation module estimates the blow-by flow based on intake manifold pressure. The blow-by estimation module estimates the blow-by flow using a lookup table indexed by intake manifold pressure. The blow-by estimation module estimates the estimated blow-by flow only when a purge valve is closed. The purge flow estimation module estimates the purge flow only when a purge valve is open. The blow-by estimation module and the purge flow estimation module are enabled only when an exhaust gas recirculation valve of the vehicle is closed.

In other features, the pressure compensation module compensates for static and dynamic pressure.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In some examples, a fuel control system according to the present disclosure employs an oxygen sensor in the intake manifold. The output of the oxygen sensor is compensated for intake manifold vacuum. A sum of purge flow and blow-by flow is estimated based on the compensated oxygen level in the intake manifold. The blow-by flow is estimated and subtracted from the sum to determine the purge flow. The fuel to be injected in a next cycle is adjusted based on the purge flow. The response time may be controlled by the sensor response with a delay calibrated from gas transport through the conduits and emptying/filling times of volumes.

Air seepage in the canister is reflected in the compensated intake oxygen level. The reduced oxygen content of the charge is also reflected in the fuel controls during purge events.

Figure 1:
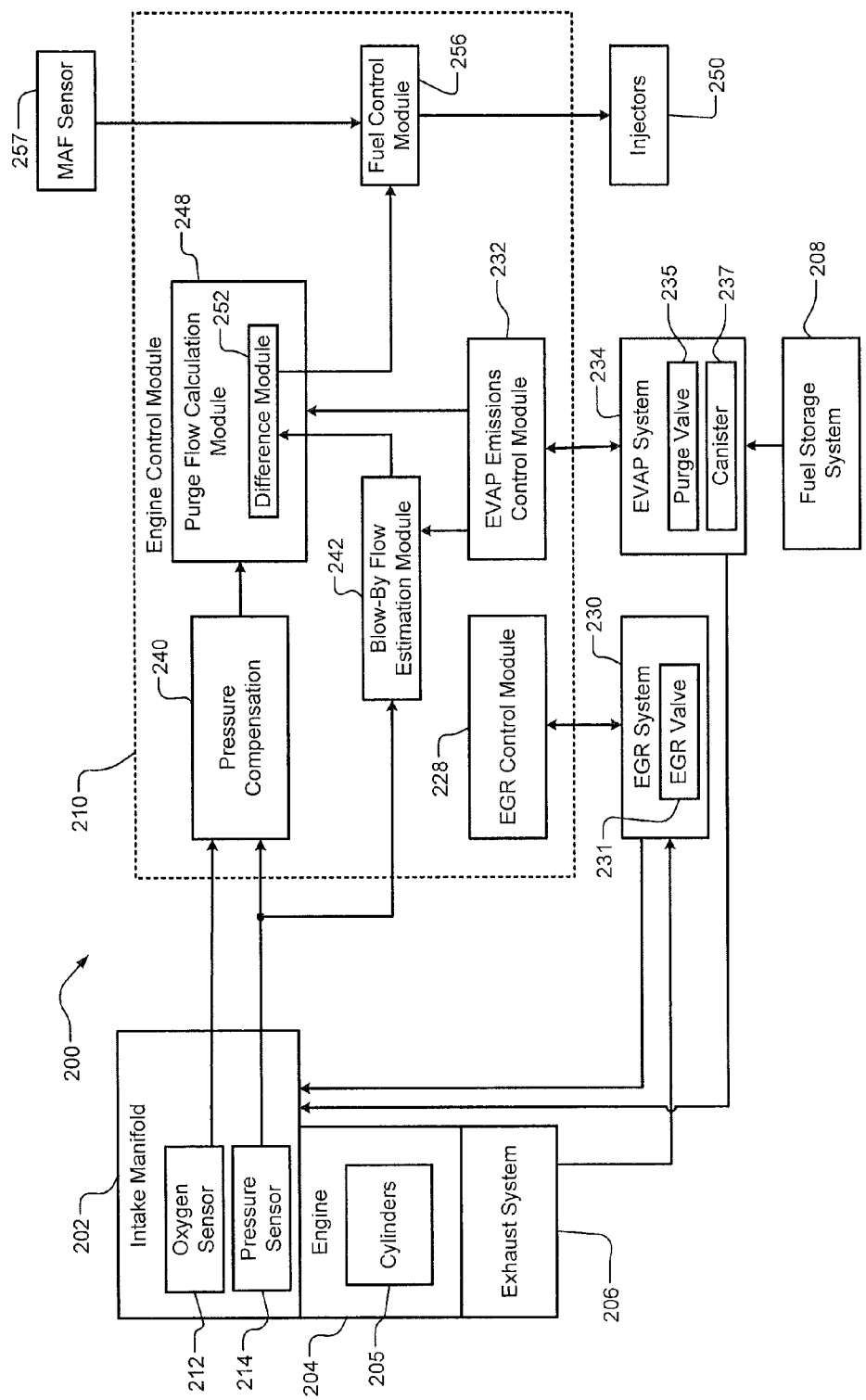
FIG. 1 is a functional block diagram of a fuel control system that adjusts fueling based on purge flow according to the present disclosure.

Referring now to FIG. 1, a functional block diagram of a control system 200 is shown. A vehicle includes an intake manifold 202, an engine 204 with cylinders 205, an exhaust system 206 and a fuel storage system 208. An intake oxygen sensor 212 and an intake pressure sensor 214 are located in the intake manifold 202 to measure intake oxygen ($O2_{IM}$) and intake pressure or vacuum ($P_{IM}$) in the intake manifold 202, respectively.

An engine control module 210 includes an exhaust gas recirculation (EGR) control module 228 to control an EGR system 230, which includes an EGR valve 231. Under certain conditions, the EGR control module 228 and the EGR system 230 recirculate some of the exhaust gas from the exhaust system 206 to the intake manifold 202. The recirculated exhaust gas mixes with intake air in the intake manifold 202 for combustion in cylinders 205 of the engine 204.

The engine control module 210 also includes an evaporative emissions control module 232 to control an evaporative emissions (EVAP) system 234, which includes a purge valve 235 and a canister 237. The canister 237 traps fuel vapor from components of the vehicle such as the fuel storage system 208. The purge valve 235 is selectively opened to purge the canister 237. The purged fuel vapor is recirculated and mixed with intake air in the intake manifold 202 and combusted in the cylinders 205 of the engine 204.

A pressure compensation module 240 receives outputs of the intake oxygen sensor 212 and the intake pressure sensor 214 and generates a compensated intake oxygen signal that is compensated for manifold pressure. In some examples, the pressure compensation module 240 compensates for static and dynamic pressure changes. Additional details relating to static and dynamic pressure compensation can be found in U.S. patent application Ser. No. 13/967,591, filed on Aug. 15, 2013.

The pressure compensation module 240 receives the intake pressure signal from the intake pressure sensor 214 and the intake oxygen signal (uncompensated) from the intake oxygen sensor 212. The pressure compensation module 240 outputs a compensated oxygen signal that is compensated for manifold pressure.

A blow-by estimation module 242 generates a blow-by signal based on a blow-by flow. The blow-by flow may be expressed as a rate or a quantity. The blow-by estimation module 242 also receives the purge enable signal from the purge control module 232. The blow-by estimate may also be based on temperature and humidity.

A purge flow calculation module 248 generates a purge flow signal based on purge flow. The purge flow calculation module 248 receives the compensated oxygen signal from the pressure compensation module 240. The purge flow calculation module 248 initially determines a sum of the purge flow and the blow-by flow. In some examples, the purge flow calculation module 248 accesses a look-up table that is indexed by the compensated oxygen signal to generate the sum of the purge flow and the blow-by flow.

The purge flow calculation module 248 includes a difference module 252 that subtracts the blow-by flow received from the blow-by estimation module 242 from the sum of the purge flow and the blow-by flow. The difference module 252 outputs the purge flow. The purge flow calculation module 248 may also receive a purge enable signal from the purge control module 232.

An output of the purge flow calculation module 248 is input to a fuel control module 256, which adjusts fueling of the injectors 250 based on the purge flow.

In some examples, a mass airflow (MAF) sensor 257 is provided to measure mass airflow. In other examples, a manifold absolute pressure (MAP) sensor 214 is used.

Figure 2:
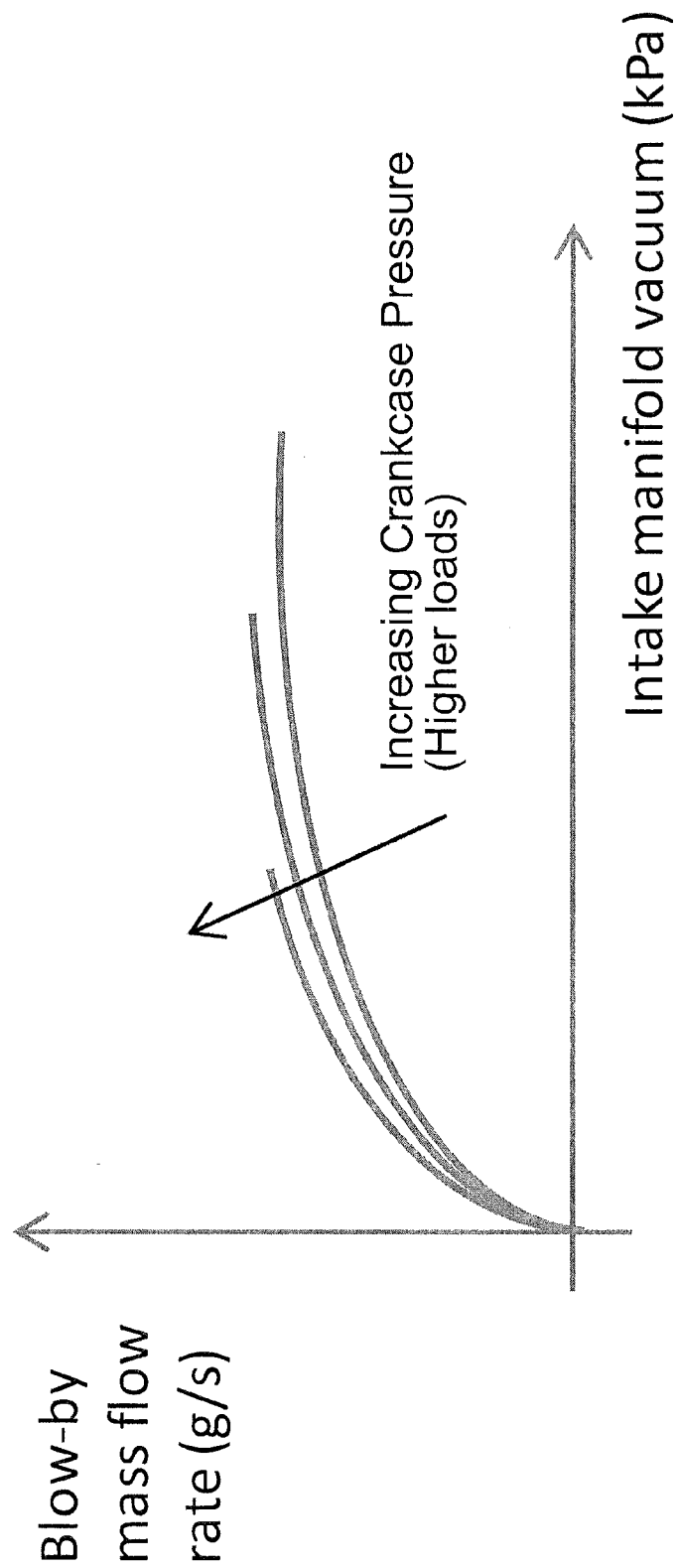
FIG. 2 is a graph illustrating operation of a blow-by estimating module according to the present disclosure.

Referring now to FIG. 2, operation of the blow-by estimation module 242 is shown. When the EGR valve 231 and the purge valve 235 are closed and negligible leakage is assumed, the oxygen sensor 204 senses blow-by gases from a crankcase of the engine, which is mostly combustion by-products. The flow rates are modeled as incompressible flow thru an orifice of given size:

$$\dot{m}_{blow-by} = c_q A \sqrt{\Delta p} \quad (1)$$

where A is area, $c_q$ is a flow coefficient, $\Delta p$=crankcase pressure−manifold pressure.

Because most engines do not have a crankcase pressure sensor, a surrogate variable of engine load (air flow) is used. Most engine control systems include a measurement or estimation of the total charge flowing thru the engine (for example only, the MAF sensor 257 or speed density calculation based on the manifold absolute pressure (MAP) sensor).

For example only, the intake oxygen sensor may read close to a predetermined value such as 20.9% (ambient air) when flow rates due to exhaust gas recirculation, the evaporative emission system (EVAP) and blow-by are negligible. In practice, 20.9% can be calibrated, and it is typically a function of humidity, ambient pressure, and temperature.

The blow-by mass flow rate, which is determined when the EGR valve and the purge valve are closed, can be used to estimate the blow-by flow using equation (1). In some examples, the equation may be implemented as a table lookup when the purge valve is open. In some examples, the lookup table for estimating blow-by can be indexed by intake manifold pressure and engine load (as in FIG. 2) or other variables.

Figure 3:
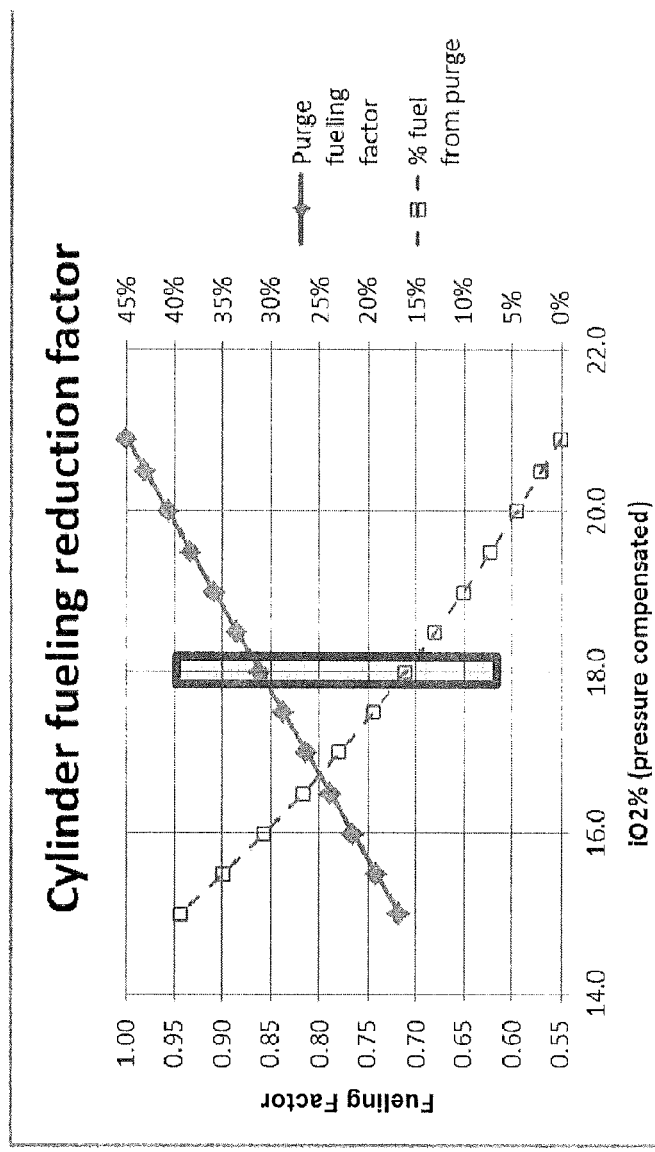
FIG. 3 is a graph illustrating operation of a purge flow estimation module according to the present disclosure.

Referring now to FIG. 3, operation of the purge flow estimation module is shown. In FIG. 3, an example of calculation of the purge flow is shown. The purge flow may be expressed as a rate or a quantity. The total charge mass flow to the engine is the sum of three terms. Here we assume opening of the EGR valve and the purge valve are mutually exclusive. $\dot{m}_{air}$ is the fresh air mass flow thru the throttle as measured by the MAF sensor. $\dot{m}_{blow-by}$ is the blow-by flow rate and $\dot{m}_{engine}$ the total flow rate by speed-density equation.

$$\dot{m}_{engine} = \dot{m}_{air} + \dot{m}_{blow} + \dot{m}_{purge} \quad (2)$$

$$\dot{m}_{blow} + \dot{m}_{purge} = \frac{20.9\% - O2_{IM}}{20.9\%} \dot{m}_{engine} \quad (3)$$

$$\dot{m}_{purge} = \frac{20.9\% - O2_{IM}}{20.9\%} \dot{m}_{engine} - \dot{m}_{blow} \quad (4)$$

$\dot{m}_{blow-by}$ is learned when purge is inactive and used when purge is active per the incompressible orifice flow equation model.

The purge flow is a mix of hydrocarbon and air (seepage). Because the oxygen sensor reads the oxygen in the seepage as air, the measured flow can be considered as hydrocarbon. Because the engine fueling with purge tends to be on the rich side, and oxygen deficiency is the constraint, the purge fueling can be implemented as a simple table lookup based on the pressure-corrected intake oxygen percentage reading.

A curve is given that specifies the % reduction in fueling based on the pressure-corrected intake oxygen percentage to keep the stoichiometry of the air fuel mixture. For example, when intake oxygen air is equal to 18%, the fuel injector has to decrease the injection quantity to 86% of the normal case, since purge will supply 16% of the fuel required for stoichiometric combustion. Additional examples are provided in FIG. 3. The examples in FIG. 3 do not account for the blow-by, which is subtracted by the difference module 252 before the purge flow adjustment is output to the fuel control module 256.

Figure 4:
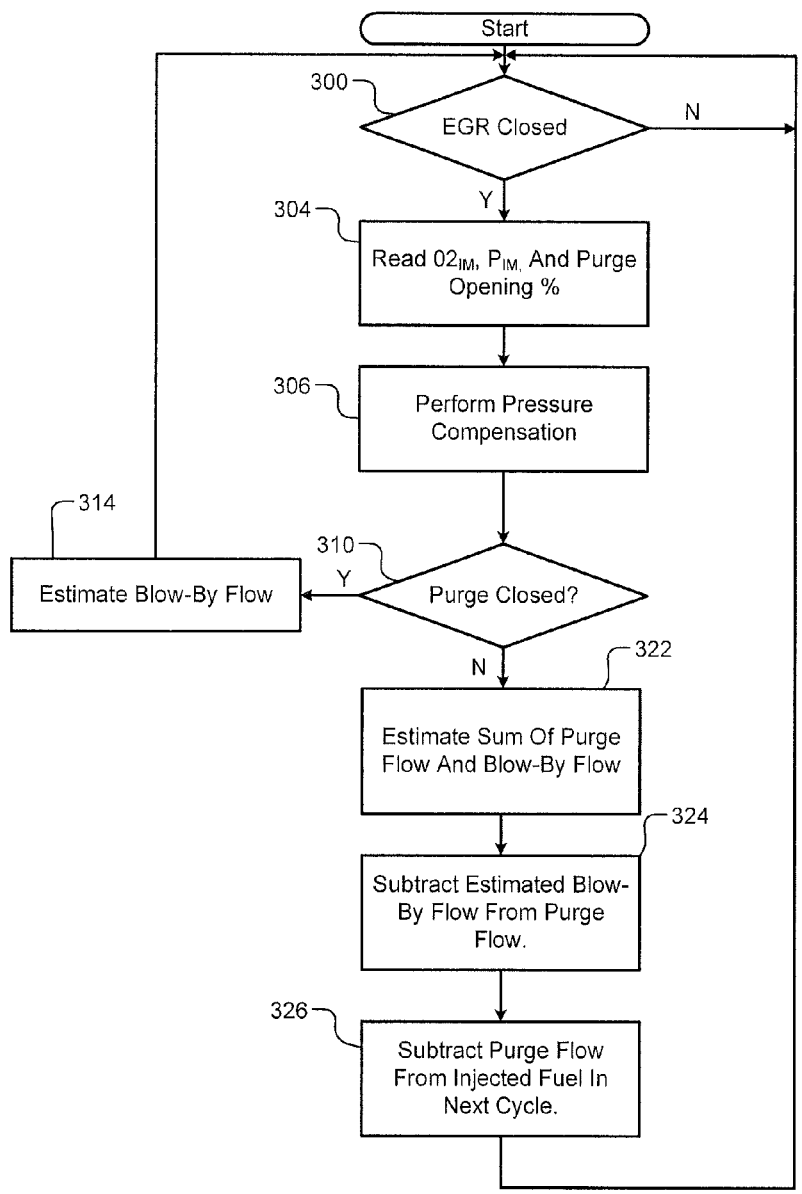
FIG. 4 is a flowchart illustrating an example of a method for operating the fuel control system of FIG. 1.

Referring now to FIG. 4, an example of a method for operating the control system of FIG. 1 is shown. At 300, control determines whether the EGR valve is closed. If not, control returns to 300. If the EGR valve is closed, at 304, control reads the intake oxygen sensor, intake pressure sensor, and opening % of the purge valve. At 306, control performs pressure compensation. At 310, control determines if the purge valve is closed. If yes, control estimates the blow-by flow at 314 and control returns to 300.

At 322, control estimates a sum of the purge flow and the blow-by flow based on the compensated intake oxygen signal. At 324, control subtracts the estimated blow-by to generate the purge flow. At 326, control subtracts purge flow rate from the injected fuel in the next cycle. The time response is controlled by the sensor response with a delay calibrated from gas transport through the conduits and emptying/filling times of volumes.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A fuel control system for a vehicle, comprising:
    a pressure compensation module that compensates an intake oxygen signal based on an intake pressure signal and that generates a compensated intake oxygen signal;
    a blow-by estimation module that generates an estimated blow-by flow;
    a purge flow estimation module that estimates the purge flow based on the compensated intake oxygen signal and the estimated blow-by flow; and
    a fuel control estimation module that reduces fueling to injectors of an engine of the vehicle based on the purge flow.

2. The fuel control system of claim 1, wherein the purge flow estimation module estimates a sum of blow-by flow and the purge flow based on the compensated intake oxygen signal.

3. The fuel control system of claim 2, wherein the purge flow estimation module estimates the sum of the blow-by flow and the purge flow using a lookup table indexed by the compensated intake oxygen signal.

4. The fuel control system of claim 2, wherein the purge flow estimation module includes a difference module that subtracts the estimated blow-by flow generated by the blow-by estimation module from the sum of the purge flow and the blow-by flow.

5. The fuel control system of claim 1, wherein the blow-by estimation module estimates the blow-by flow based on intake manifold pressure.

6. The fuel control system of claim 1, wherein the blow-by estimation module estimates the blow-by flow using a lookup table indexed by intake manifold pressure.

7. The fuel control system of claim 1, wherein the blow-by estimation module estimates the estimated blow-by flow only when a purge valve is closed.

8. The fuel control system of claim 1, wherein the purge flow estimation module estimates the purge flow only when a purge valve is open.

9. The fuel control system of claim 1, wherein the blow-by estimation module and the purge flow estimation module are enabled only when an exhaust gas recirculation valve of the vehicle is closed.

10. The fuel control system of claim 1, wherein the pressure compensation module compensates for static and dynamic pressure.

11. A method for controlling a fuel control system of a vehicle, comprising:
    compensating an intake oxygen signal based on an intake pressure signal to generate a compensated intake oxygen signal;
    generating an estimated blow-by flow;
    estimating a purge flow based on the compensated intake oxygen signal and the estimated blow-by flow; and
    reducing fueling to injectors of an engine of the vehicle based on the purge flow.

12. The method of claim 11, further comprising estimating a sum of blow-by flow and the purge flow based on the compensated intake oxygen signal.

13. The method of claim 12, further comprising estimating the sum of the blow-by flow and the purge flow using a lookup table indexed by the compensated intake oxygen signal.

14. The method of claim 12, further comprising subtracting the estimated blow-by flow from the sum of the purge flow and the blow-by flow.

15. The method of claim 11, further comprising estimating the blow-by flow based on intake manifold pressure.

16. The method of claim 11, further comprising estimating the blow-by flow using a lookup table indexed by intake manifold pressure.

17. The method of claim 11, further comprising estimating the estimated blow-by flow only when a purge valve is closed.

18. The method of claim 11, further comprising estimating the purge flow only when a purge valve is open.

19. The method of claim 11, further comprising enabling estimation of the blow-by flow and the purge flow only when an exhaust gas recirculation valve of the vehicle is closed.

20. The method of claim 11, wherein the compensating the intake oxygen signal includes compensation for static and dynamic pressure.

* * * * *